(12) United States Patent
Ishii et al.

(10) Patent No.: US 6,564,891 B2
(45) Date of Patent: May 20, 2003

(54) POWER TAKE-OFF ASSEMBLY FOR WORKING VEHICLES

(75) Inventors: Norihiro Ishii, Itami (JP); Hirohiko Kawada, Amagasaki (JP); Hiroshi Tottori, Minou (JP); Kentaro Nagata, Itami (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 87 days.

(21) Appl. No.: 09/846,491

(22) Filed: Apr. 30, 2001

(65) Prior Publication Data

US 2002/0003051 A1 Jan. 10, 2002

(30) Foreign Application Priority Data

Jul. 10, 2000 (JP) .......................... 2000-208154
Sep. 19, 2000 (JP) .......................... 2000-283648

(51) Int. Cl.[7] .............................................. B60K 17/28
(52) U.S. Cl. ........................................ 180/53.1; 74/11
(58) Field of Search ............................. 180/53.1, 53.6, 180/53.62; 74/11, 15.2, 15.6, 15.63, 15.69, 15.8, 15.84, 15.86, 15.88

(56) References Cited

U.S. PATENT DOCUMENTS

| 5,099,936 A | 3/1992 | Irikura et al. |
| RE34,833 E | * 1/1995 | Hasegawa et al. ............ 475/83 |
| 5,901,605 A | 5/1999 | Oosterhuis et al. |
| 5,947,218 A | * 9/1999 | Ishimaru .................... 180/53.1 |

* cited by examiner

Primary Examiner—Paul N. Dickson
Assistant Examiner—Faye M. Fleming

(57) ABSTRACT

A power take-off casing (47) including therein a rear-PTO shaft (12) and a transmission mechanism (50) therefor is mounted on an outer surface of a rear wall (3c) of the transmission casing (3) disposed between left and right rear wheels (4) which constitute drive wheels for a working vehicle, and a gear (52) constituting an input member of the transmission mechanism is operatively connected to a drive mechanism (46) for a mid-PTO shaft (9) which extends forwardly from the inside of transmission casing through a front wall (3a) thereof. A clutch (60) for selectively cutting-off the drive of the rear-PTO shaft is provided preferably such that it couples the gear selectively to a drive gear (58) which is rotatably mounted on the mid-PTO shaft. In a working vehicle in which a transmission casing is disposed between left and right front wheels constituting the drive wheels for the vehicle, a power take-off casing having a front-PTO shaft is mounted on an outer surface of a front wall of the transmission casing.

11 Claims, 10 Drawing Sheets

POWER TAKE-OFF ASSEMBLY FOR WORKING VEHICLES

FIELD OF THE INVENTION

This invention relates to a power take-off assembly for a working vehicle in which a rear- or front-PTO shaft is particularly provided in addition to a mid-PTO shaft in a very simple manner whereby an essential part of the vehicle can be made common to a working vehicle having only a mid-PTO shaft and a working vehicle having a mid-PTO shaft and a rear- or front-PTO shaft.

BACKGROUND OF THE INVENTION

There are disclosed in U.S. Pat. Nos. 5,099,936 and 5,901,605 techniques that a rear-PTO shaft is additionally provided to a working vehicle having a mid-PTO shaft in a simple manner.

Of these patents, U.S. Pat. No. 5,099,936 discloses a working vehicle in which a transmission casing having left and right rear wheel axles is disposed between left and right rear wheels and in which there is provided a mid-PTO shaft which extends from the inside of the transmission casing through a front wall of the casing. For providing a rear-PTO shaft, a rear cover of the transmission casing of a working vehicle having only a mid-PTO shaft is removed and, in place of it, a power take-off casing which includes in it a rear-PTO shaft extending rearwardly of the power take-off casing and a transmission mechanism for transmitting power to the rear-PTO shaft is mounted on a rear end of the transmission casing. An input member of the transmission mechanism is operatively connected to a final drive gear, which is rotatably mounted on the mid-PTO shaft, through a clutch which is shifted selectively to a position where the final gear is coupled only to the mid-PTO shaft, another position where the final gear is coupled to both of the mid-PTO shaft and the input member, and a further position where the final gear is coupled only to the input member.

U.S. Pat. No. 5,901,605 discloses a working vehicle in which there is provided a transmission casing including therein a mid-PTO shaft which extends from the inside of the transmission casing forwardly of the casing an electromagnetic clutch which is disposed between coaxially arranged input and output shafts for selectively coupling the shafts, and a speed reduction gearing which transmits power from the output shaft to the mid-PTO shaft. For converting a working vehicle having only a mid-PTO shaft into a working vehicle having a mid-PTO shaft and a rear-PTO shaft, a rear cover of the transmission casing is exchanged for a new rear cover and a transmission shaft in the reduction gearing is exchanged for a clutch shaft and, at the same time, positions of a part of gears in the reduction gearing are changed. The rear-PTO shaft is supported by the new rear cover and by a rear-PTO cover which is secured to a rear surface of the new rear cover, and there is provided on the clutch shaft a clutch which is shifted selectively to a position where power is transmitted only to the mid-PTO shaft, another position where power is transmitted to both of the mid-PTO shaft and the rear-PTO shaft, and a further position where power is transmitted only to the rear-PTO shaft.

Therefore, for converting a working vehicle having only a mid-PTO shaft into a working vehicle having a mid-PTO shaft and a rear-PTO shaft, each of the above-referenced U.S. patents requires removal or exchange of the rear cover of the transmission casing so that the converting operation is troublesome. Particularly, the rear cover of the transmission casing is used for supporting transmission shafts or gear-supporting shafts in the transmission casing, which makes the converting operation troublesome. The converting operation is very troublsome with respect to the power take-off assembly disclosed in U.S. Pat. No. 5,901,605 because it requires position-changing operation of a part of gears in the reduction gearing as well.

Accordingly, a primary object of the present invention is to provide a novel power take-off assembly for a working vehicle in which a rear- or front-PTO shaft is provided in a manner such that converting operation from a working vehicle having only a mid-PTO shaft into a working vehicle having a mid-PTO shaft and a rear- or front-PTO shaft can be made very easily. Another object of the invention is to provide a novel power take-off assembly for a working vehicle in which a rear- or front-PTO shaft is provided in a manner such that a working vehicle having only a mid-PTO shaft can be offered to numerous users requring no rear- or front-PTO function with a low cost.

SUMMARY OF THE INVENTION

The present invention relates to a power take-off assembly for a working vehicle in which a transmission casing (3) having left and right drive wheel axles (4a) is disposed between left and right drive wheels (4) and in which there is provided a mid-PTO shaft (9) which extends from the inside of the transmission casing (3) through an axial end wall (3a) of the transmission casing located at an inner side of the longitudinal direction of the vehicle. The power take-off assembly according to the present invention is characterized in:

that a power take-off casing (47) is mounted on an outer surface of an axial end wall (3c) of the transmission casing (3) located at an outer side of the longitudinal direction of the vehicle, the power take-off casing (47) including in it a second PTO shaft (12), which extends from the power take-off casing toward a direction opposite to the mid-PTO shaft (9), and a transmission mechanism (50) for transmitting power to the second PTO shaft (12);

that an input member (52) of the transmission mechanism (50) is operatively connected to a drive mechanism (46) for the mid-PTO shaft (9) in the transmission casing (3) through an opening (44) in the axial end wall (3c) in the transmission casing (3) located at the outer side of the longitudinal direction of the vehicle; and that a clutch (60) for selectively cutting-off the transmission of power to the second PTO shaft (12) is provided.

The above-referenced second PTO shaft is a rear-PTO shaft extending rearwardly of the power take-off casing when the above-referenced drive wheels are left and right rear wheels between which the transmission casing is disposed, whereas the second PTO shaft is a front-PTO shaft extending forwardly of the power take-off casing when the drive wheels are left and right front wheels between which the transmission casing is disposed.

Because the power take-off assembly according to the present invention is structured such that, while the structure of the transmission casing (3) remains unchanged, a power take-off casing (47) including therein a second PTO shaft (12) and a transmission mechanism (50) therefor is mounted on the outer surface of an end wall (3c) of the transmission casing located at an outer side of the longitudinal direction of the vehicle and an input member (52) of the transmission mechanism is operatively connected to the drive mechanism (46) for the mid-PTO shaft (9) through an opening (44) in the axial end wall, the axial end wall (3c) is made common to a working vehicle having only a mid-PTO shaft and a working vehicle having a mid-PTO shaft and a second PTO shaft, so that the axial end wall can be used commonly to both kinds of the working vehicles for supporting transmission shafts or gear-supporting shafts. Accordingly, in converting a working vehicle having only a mid-PTO shaft into a working vehicle having a mid-PTO shaft and a second PTO shaft, removal or exchange of a rear cover corresponding to such an axial end wall, which is required in the above-referenced two U.S. patents, is no more required and the converting operation can be perfomed very easily, while the axial end wall is used for supporting shafts as it is, only by mounting the power take-off casing onto the outer surface of the axial end wall and by connecting the input member to the drive mechanism for the mid-PTO shaft. For converting a working vehicle having a mid-PTO shaft and a rear- or front-PTO shaft into a working vehicle having only a mid-PTO shaft, it is satisfactory that the power take-off casing (47) is removed and the above-referenced opening (44) in the axial end wall of the transmission casing is closed by a suitable cover member, so that a working vehicle having only a mid-PTO shaft can be offered to users at a very low cost. The clutch (60) for selectively cutting-off the transmission of power to the second PTO shaft (12) can be provided in any optional position of the transmission mechanism (50).

Preferably, the clutch (60) is operable to selectively drive the mid-PTO shaft (9) or the second PTO shaft (12). For achieving such a clutch with a simple structure, it is preferred that the input member (52) is arranged coaxially with the mid-PTO shaft (9), that the drive mechanism (46) includes a drive gear (58) which is rotatably mounted on the mid-PTO shaft (9) and is meshed with a gear (41) of driving side, and that the clutch (60) is structured such that it is shifted selectively to a condition where the drive gear (58) is coupled to the mid-PTO shaft (9) and to another condition where the drive gear (58) is coupled to the input member (52). Preferably, the clutch (60) is structured such that it is further shifted to a condition where the drive gear (58) is coupled to the mid-PTO shaft (9) and to the input member (52) at a same time. In this case, the mid-PTO shaft (9) and the second PTO shaft (12) can be driven to rotate at a same time.

Alternatively, it is preferred that the input member (52) is arranged coaxially with an intermediate drive shaft (40) which is provided in the drive mechanism (46) and is operatively connected to the mid-PTO shaft (9), that the drive mechanism (46) includes a drive gear (41A) which is rotatably mounted on the intermediate drive shaft (40) and is meshed with a gear (34) of driving side, and that the clutch (60) is structured such that it is shifted selectively to a condition where the drive gear (41A) is coupled to the intermediate drive shaft (40) and to another position where the drive gear (41A) is coupled to the input member (52). This structure also allows to drive selectively the mid-PTO shaft (9) or the second PTO shaft (12). Preferably, the clutch (60) is structured such that it is further shifted to a condition where the drive gear (41A) is coupled to the intermediate drive shaft (40) and to the input member (52) at a same time. In this case, the mid-PTO shaft (9) and the second PTO shaft (12) can be driven to rotate at a same time.

It is dangerous for an operator to get out of the vehicle while the mid-PTO shaft is rotating. In a preferred embodiment, there is further provided a sensor switch (67) for sensing coupling conditions of the drive gear (58) to the mid-PTO shaft (9) or coupling conditions of the drive gear (41A) to the intermediate drive shaft (40) such that the sensor switch (67) is operated by a shifter member (63) for shifting the clutch (60). When the sensor switch is in an operated condition, the operator will stop the rotation of mid-PTO shaft by the operation of clutch so as to avoid a danger in advance.

It is often the cases that the second PTO shaft or the rear- or front-PTO shaft is used for driving an auxiliary implement of a high load. According to a preferred embodimemt of the present invention, the input member is composed of an input gear (52) mounted on a shaft (51; 73) which is arranged in parallel with the second PTO shaft (12) and is supported by the power take-off casing (47). Further, the transmission mechanism (50) comprises a speed-reduction gear train for transmitting power from the input gear (52) to the second PTO shaft (12) at a reduced speed of rotation.

In the power take-off assembly according to the present invention, the number of PTO shafts can be increased in the following manner. That is, the input gear (52) is fixedly mounted on the shaft (73) for mounting the input gear and this shaft is extended outwardly from the power take-off casing (47) toward a direction same as the second PTO shaft (12) so as to provide a third PTO shaft (73). The third PTO shaft can be used, for example, to drive a generator which feeds electric power to an electrically driven implement such as a chain saw.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
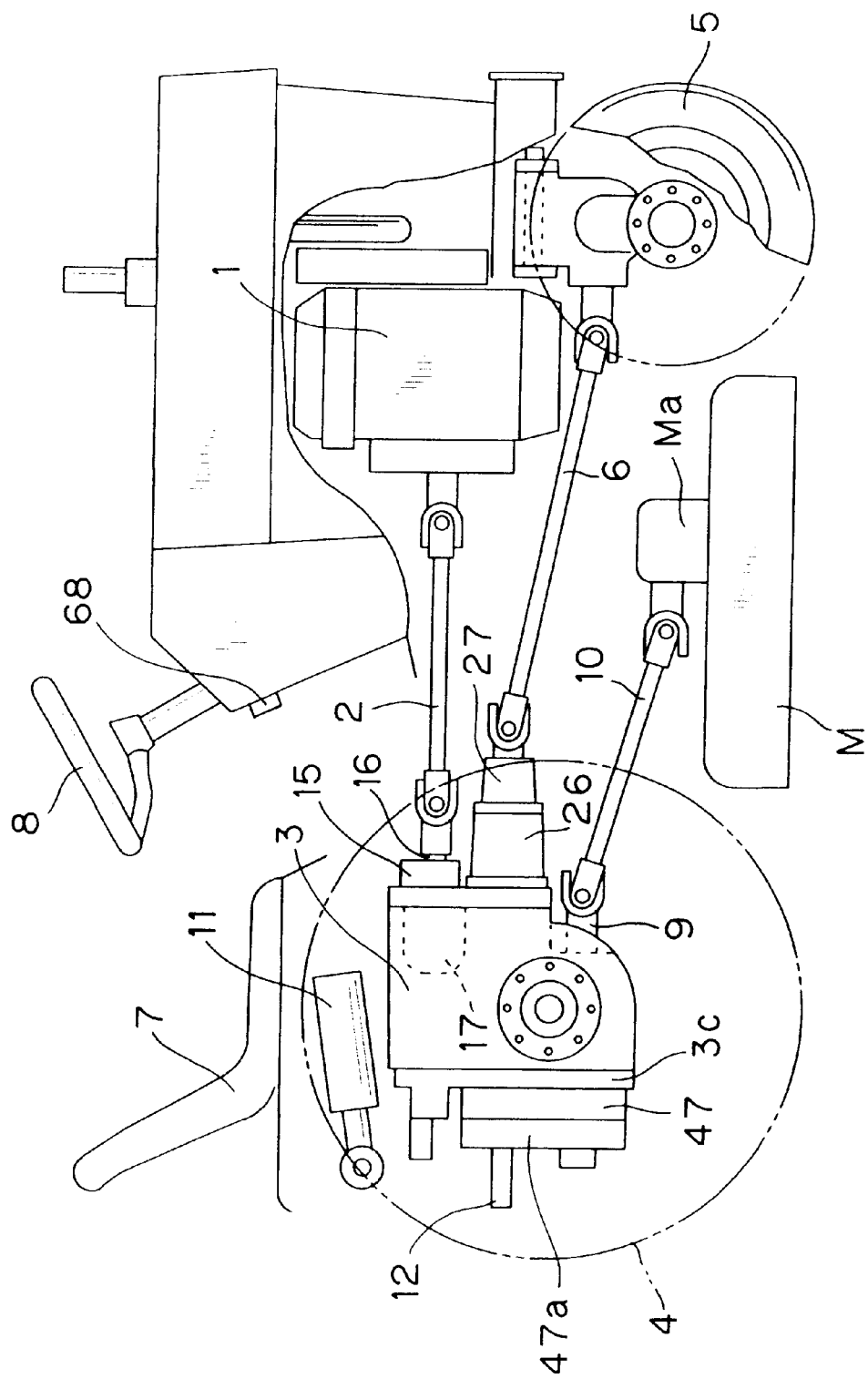
FIG. 1 is a schematic side view, partially cut away, of a working vehicle in which a first preferred embodiment of the present invention is employed.

FIG. 1 depicts a working vehicle in which a first embodiment of the power take-off assembly according to the present invention is employed. An Engine 1 as a drive source is mounted on a front end of the vehicle, and a transmission casing 3 which is supplied with power from the engine 1 through a transmission shaft 2 is arranged between left and right rear wheels 4 which constitute drive wheels for the vehicle. Left and right front wheels 5 are driven to rotate when required and, for this purpose, a transmission shaft 6 is provided which transmits power from the transmission casing 3 toward the front wheels 5. A seat 7 is provided at a location above the transmission casing 3, and a steering wheel 8 for steering the vehicle by turning the left and right wheels 5 is provided at a location before the seat. There is equipped between the front and rear wheels 5 and 4 a mid-mount mower M which is driven by a mid-PTO shaft 9, extending forwardly from a lower position of the inside of the transmission casing 3, through a transmission shaft 10 connected to a gear box Ma of the mower M. An auxiliary implement (not shown) such as a rotary tiller to be drawn by the vehicle is lifted and lowered by a pair of hydraulic lift cylinders 11 disposed between the transmission casing 3 and the seat 7. The auxiliary implement is adapted to be driven by a rear-PTO shaft 12 which extends rearwardly of the vehicle.

Figure 2:
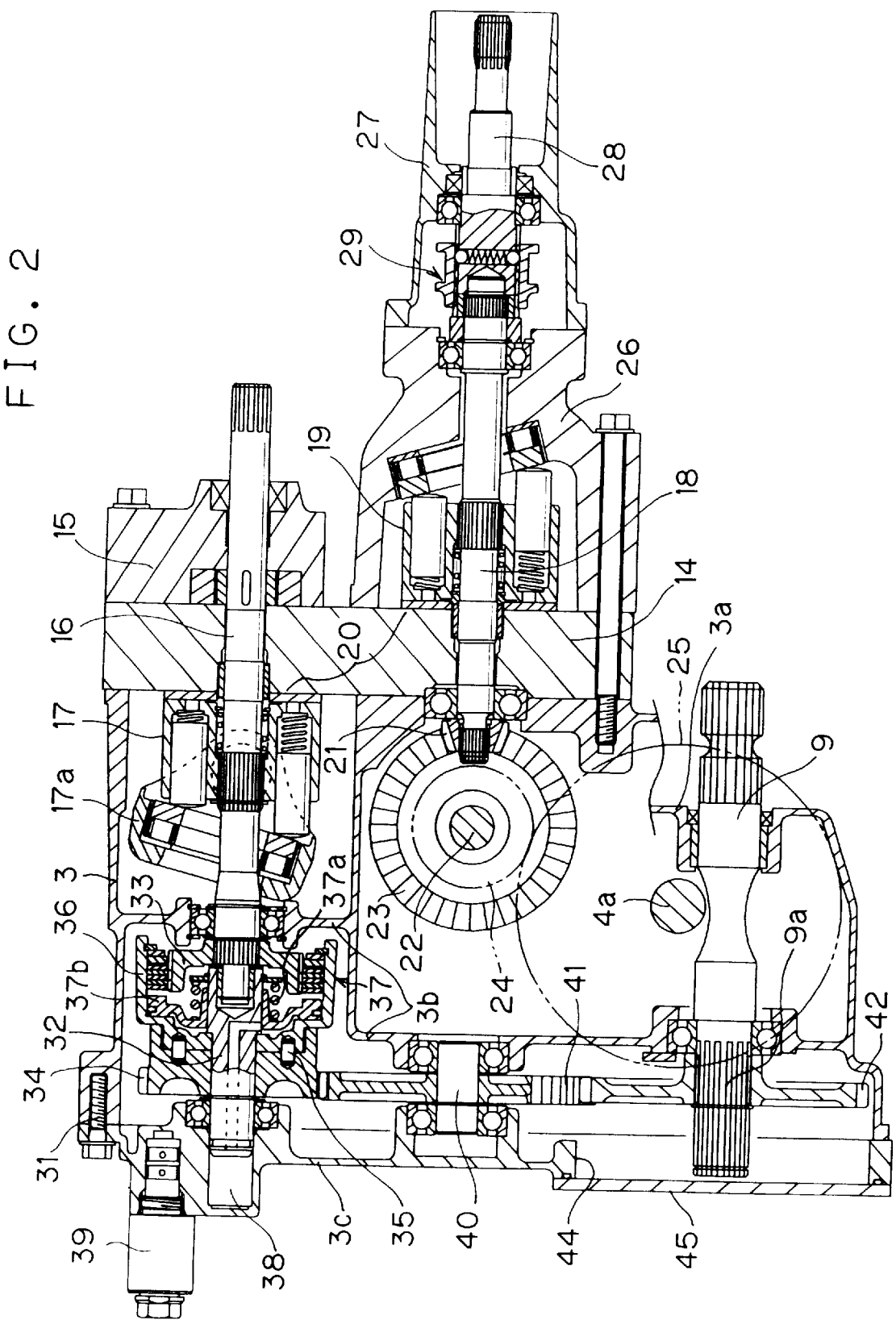
FIG. 2 is a sectional side view, partially developed, of a transmission casing of a working vehicle in which only a mid-PTO shaft is provided.

FIG. 2 depicts a transmission casing 3 which includes only the mid-PTO shaft 9 and does not include the rear-PTO shaft 12. A basic structure of the transmission casing 3 will be described first by referring to FIG. 2. A plate member 14 having a relatively large thickness is secured to the front of transmission casing 3. The mid-PTO shaft 9 extends forwardly through a front wall 3a of the transmission casing 3 at a location below the plate member 14. An oil pump 15 is secured to a front and upper location of the plate member 14, and the transmission casing 3 is provided at an upper location thereof with an input shaft 16 which extends forwardly through the plate member 14 and through the oil pump 15. The oil pump 15 is fashioned into a gear pump using the input shaft 16 as its pump shaft, and the input shaft 16 is connected at its front end to the transmission shaft 2 shown in FIG. 1.

A hydraulic pump 17 driven by the input shaft 16 is secured to a rear surface of the plate member 14 and is located at an upper location within the transmission casing 3, and a hydraulic motor 19 having an output shaft 18 is secured to a front surface of the plate member 14 at a lower half of the plate member. These hydraulic pump and motor 17 and 19 are connected to each other through a pair of fluid paths (not shown) in the plate member 14 so as to form a closed circuit and to thereby provide a hydrostatic transmission 20. Each of the hydraulic pump 17 and hydraulic motor 19 is composed of an axial plundger type, and the output shaft 18 of hydraulic motor 19 is driven in a non-stepwise manner by controlling the angle of a tiltable swash plate 17a of the hydraulic pump 17.

The output shaft 18 of hydraulic motor 19 extends through the plate member 14 into the transmission casing 3 and fixedly carries at its rearmost end a bevel pinion 21. A bevel gear 23 meshing with the bevel pinion 21 is mounted on a transmission shaft 22 which extends laterally of the transmission casing 3 and is supported by the casing, and a speed-reduction gearing (not shown) for transmitting power from the bevel gear 23 to a gear 24 which is also mounted on the transmission shaft 22 is provided between the transmission shaft 22 and another transmission shaft (not shown). The gear 24 is meshed with a larger input gear 25 of a differential gearing (not shown) for the left and right rear wheels 4, and rear wheel axles 4a constituting left and right output shafts of the differential gearing are journalled in the transmission casing 3 so as to drive the left and right rear wheels 4. For driving the front wheels 5, a front wheel drive case 27 into which the output shaft 18 extends is secured to a front end of a motor casing 26 which covers the hydraulic motor 19. A front wheel drive shaft 28, which is connected to the transmission shaft 6 shown in FIG. 1, is arranged within the drive case 27 coaxially with the output shaft 18, and a front wheel drive clutch 29 for selectively coupling the drive shaft 28 to the output shaft 18 is disposed between these shafts 18 and 28.

The input shaft 16 extends further rearwardly from the hydraulic pump 17 and is supported at its rear side by a support wall 3b within the transmission casing 3 through a bearing. A rear end opening of the transmission casing 3 is covered by a rear cover 3c which is secured to the casing using bolts 31, and a transmission shaft 32, which is disposed coaxially with the input shaft 16, is supported by a rear end of the input shaft 16 and by the rear cover 3c. A rotatable support member 33 is fixedly mounted in a rear end portion of the input shaft 16, and a clutch housing 36 is secured to a gear 34, which is fixedly mounted on the transmission shaft 32, using pins 35. A PTO clutch 37 is provided by plural frictional elements slidably but non-rotatably supported by the support member 33 and by another plural frictional elements slidably but non-rotatably supported by the clutch housing 36. The PTO clutch 37 is fashioned into a fluid-operated type which is operated by applying a fluid pressure to a piston 37b against the biasing force of a return spring 37a so as to advance the piston 37b and to thereby engage the frictional elements.

A fluid path for supplying the fluid pressure to the PTO clutch 37 is formed in the transmission shaft 32 and is communicated with a fluid chamber 38 within the rear cover 3c. An electromagnetic directional control valve 39 for controlling the fluid supply to the fluid-operated PTO clutch 37 is mounted on an outer surface of the rear cover 3c and is connected to the oil pump 15 at the front side of transmission casing 3.

A gear 41 is mounted on a support shaft 40, which is supported respectively by the support wall 3b and by the rear cover 3c through bearings, and is meshed with the gear 34 on the transmission shaft 32. A rear end portion of the mid-PTO shaft 9 is supported by the support wall 3b and extends rearwardly from the support wall 3b, and a gear 42, which is meshed with the gear 41 on the support shaft 40, is fixedly mounted on the mid-PTO shaft 9 using splines 9a in the outer surface of mid-PTO shaft. An opening 44, which is faced to the mid-PTO shaft 9, is formed in the rear cover 3c and is closed by a cover member 45.

From the structure set forth above, the transmission casing 3 shown in FIG. 2 is operable to drive the left and right rear wheel axles 4a and rear wheels 4 and, when required, to also drive the left and right front wheels 5 at a non-stepwisely controlled speed of rotation and is also operable to drive the mid-PTO shaft 9 by operating the PTO clutch 37.

FIG. 1 and FIGS. 3 to 5 depict the first embodiment of the present invention in which the part of transmission casing 3 not shown in these figures has the same structure that has been detailed with respect to FIG. 2. A power take-off casing 47 is fixedly mounted on a rear suface of the rear cover 3c using bolts 48. The power take-off casing 47 has a rear end opening which is closed by a cover plate 47a secured to the casing 47 using bolts 49.

Figure 3:
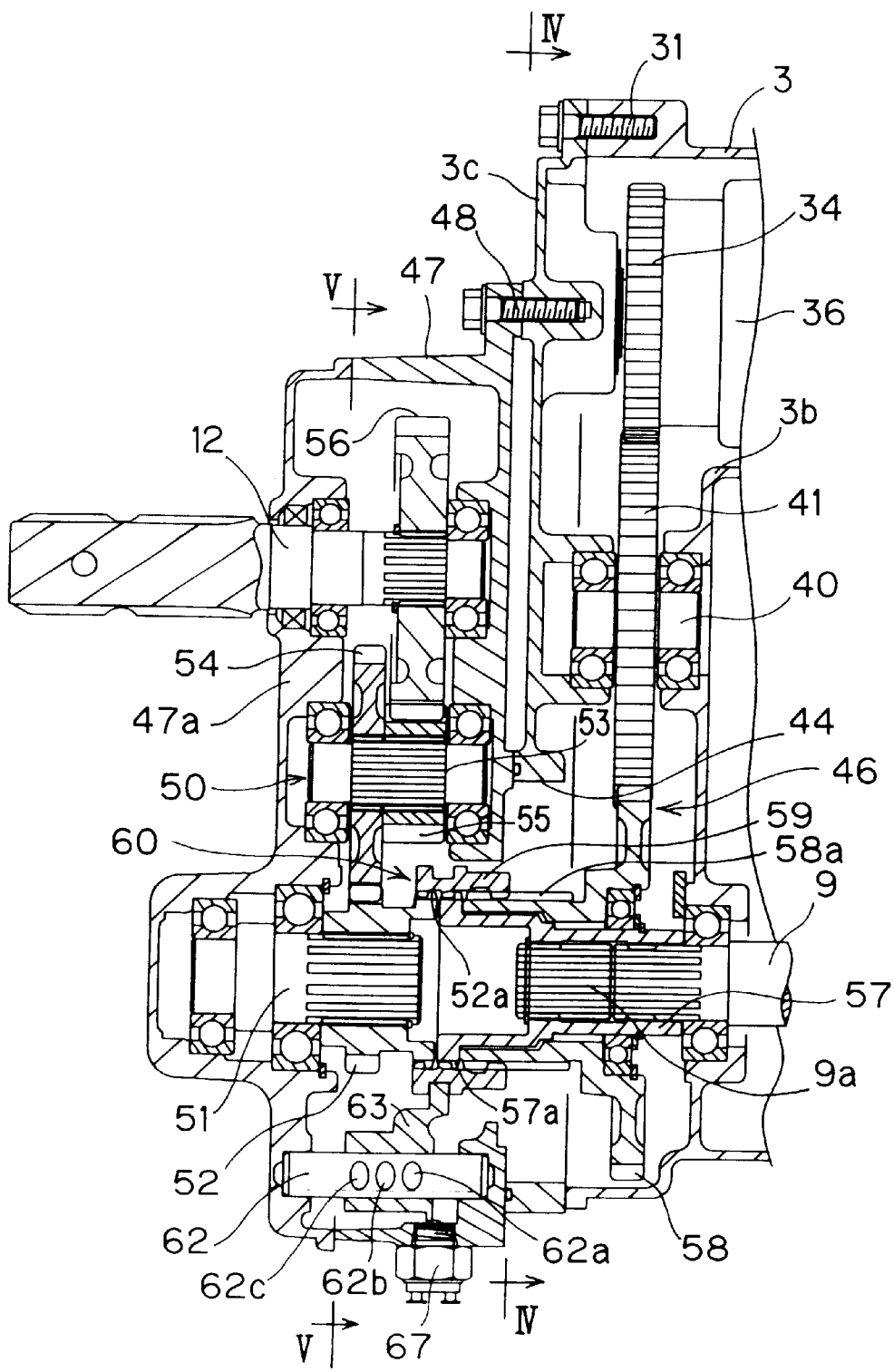
FIG. 3 is a sectional side view, partially developed, of a part of the first embodiment in which an essential part of a transmission casing is omitted.

As shown in FIG. 3, the rear-PTO shaft 12 having been described in reference to FIG. 1 is supported by the power take-off casing 47 and by the cover plate 47a through bearings and extends rearwardly of the casing 47 at a level higher than that of the mid-PTO shaft 9. The power take-off casing 47 includes in it a transmission mechanism 50 for transmitting power to the rear-PTO shaft 12. The transmission mechanism 50 is structured into a speed-reduction gearing composed of a gear 52 mounted, by means of a splined connection, on a support shaft 51 which is supported by the cover plate 47a through a pair of bearings, a pair of gears 54 and 55 mounted, by means of a splined connection, on a transmission shaft 53 which is supported by the power take-off casing 47 and by the cover plate 47a through bearings, and a gear 56 mounted on the rear-PTO shaft 12 by means of a splined connection. The larger gear 54 on the transmission shaft 53 is meshed with the gear 52 on the support shaft 51 to provide a speed-reduction transmission between the shafts 51 and 53, whereas the smaller gear 55 on the transmission shaft 53 is meshed with the gear 56 on the rear-PTO shaft 12 to provide a speed-reduction transmission between the shafts 53 and 12.

The support shaft 51 is arranged coaxially with the mid-PTO shaft 9. The gear 52, which constitutes an input member of the transmission mechanism 50, has a boss portion extending toward the mid-PTO shaft 9 and is provided, at its end, with splined teeth 52a. The above-referenced cover member 45 (FIG. 2) is removed, and the drive mechanism for the mid-PTO shaft 9 composed of the above-referenced gears 34, 41 and 42 is replaced by a drive mechanism 46 which includes, in place of the gear 42, a gear 58 which is mounted rotatably on a sleeve 57 which is in turn mounted on the mid-PTO shaft 9 by means of a splined connection using the splines 9a. The sleeve 57 extends toward the gear 52 and is provided, at its end, with splined teeth 57a which are adjacent to the splined teeth 52a, and the gear 58 has a boss portion extending toward the the gear 52 and is provided with splined teeth 55a which are adjacent to the splined teeth 57a. A sleeve-shaped clutch member 59 is slidably mounted on the splined teeth 52a, 57a and 58a and is provided, in its inner surface, with three sets of splined teeth 59a, 59b and 59c (FIG. 6) which are formed intermittently along the length of clutch member 59.

The clutch member 59 is adapted to be slidingly displaced to three positions. The splined teeth 59a, 59b and 59c of clutch member 59 are formed such that, in accordance with the displaced positions of clutch member, the foremost splined teeth 59a are always kept engaged with the splined teeth 58a of gear 58, the middle splined teeth 59b are disengaged from the splined teeth 57a of sleeve 57 at the foremost displaced position of clutch member 59, are engaged with the splined teeth 57a of sleeve 57 at the intermediate displaced position of clutch member 59, and are engaged with the splined teeth 52a of gear 52 at the rearmost displaced position of clutch member 59, and the rearmost splined teeth 59c are engaged with the splined teeth 57a of sleeve 57 at the foremost displaced position of clutch member 59, are engaged with the splined teeth 52a of gear 52 at the intermediate displaced position of clutch member 59, and are disengaged from the splined teeth 52a of gear 52 at the rearmost displaced position of clutch member 59.

Thus, a clutch 60 is provided which is operable, in accordance with the displaced positions of clutch member 59, to couple the sleeve 57 to the gear 58 at the foremost displaced position of clutch member 59 so as to drive only the mid-PTO shaft 9, to couple the sleeve 57 and the gear 52 to the gear 58 at the intermediate displaced position of clutch member 59 so as to drive both of the mid-PTO shaft 9 and the rear-PTO shaft 12, and to couple the gear 52 to the gear 58 at the rearmost displaced position of clutch member 59 so as to drive only the rear-PTO shaft 12.

Figure 5:
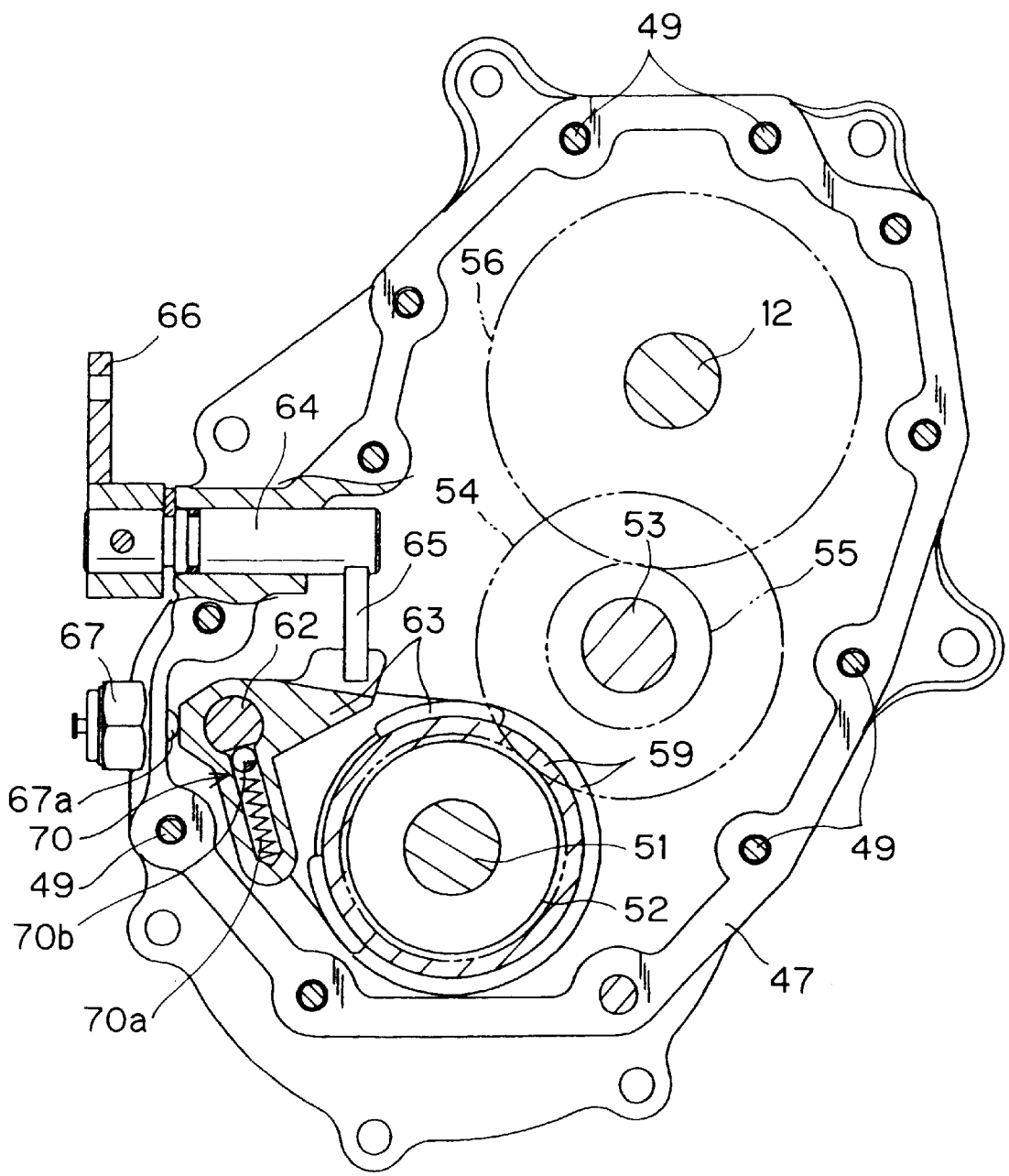
FIG. 5 is an enlarged sectional view taken generally along line V—V of FIG. 3.

For displacing the clutch member 59 to slide, a forked clutch shifter 63 which is engaged with the clutch member 59 is slidably mounted on a guide shaft 62 which extends in a longitudinal direction of the vehicle and is fixedly supported by the power take-off casing 47, as shown in FIGS. 3 and 5. A rotatable control shaft 64 having, at its inner end, an arm 65 which engages the clutch shifter 63 extends through a side wall of the power take-oft casing 47, and the clutch shifter 63 is adapted to be shifted by the rotational displacement of control shaft 64 by means of an arm 66 secured to an outer end of the control shaft 64. A sensor switch 67, which is fixedly supported by the power take-off casing 47, is particularly provided, and a movable contact 67a of the sensor switch 67 is faced, at an inside of the power take-off casing 47, to the clutch shifter 63 such that, when the clutch shifter 63 is displaced to the positions where the mid-PTO shaft 9 IS driven, namely to the positions where only the mid-PTO shaft 9 is driven and where the mid-PTO shaft 9 and the rear-PTO shaft 12 are driven, the movable contact 67a is pushed by the clutch shifter 63 whereby the sensor switch 67 is operated. The sensor switch 67 is connected to a pilot lamp 68 shown in FIG. 1 so that, when the mid-PTO shaft 9 is driven to rotate, an operator can operate the clutch 60 or PTO clutch 37 before getting out of the vehicle so as to avoid a danger in advance.

Figure 4:
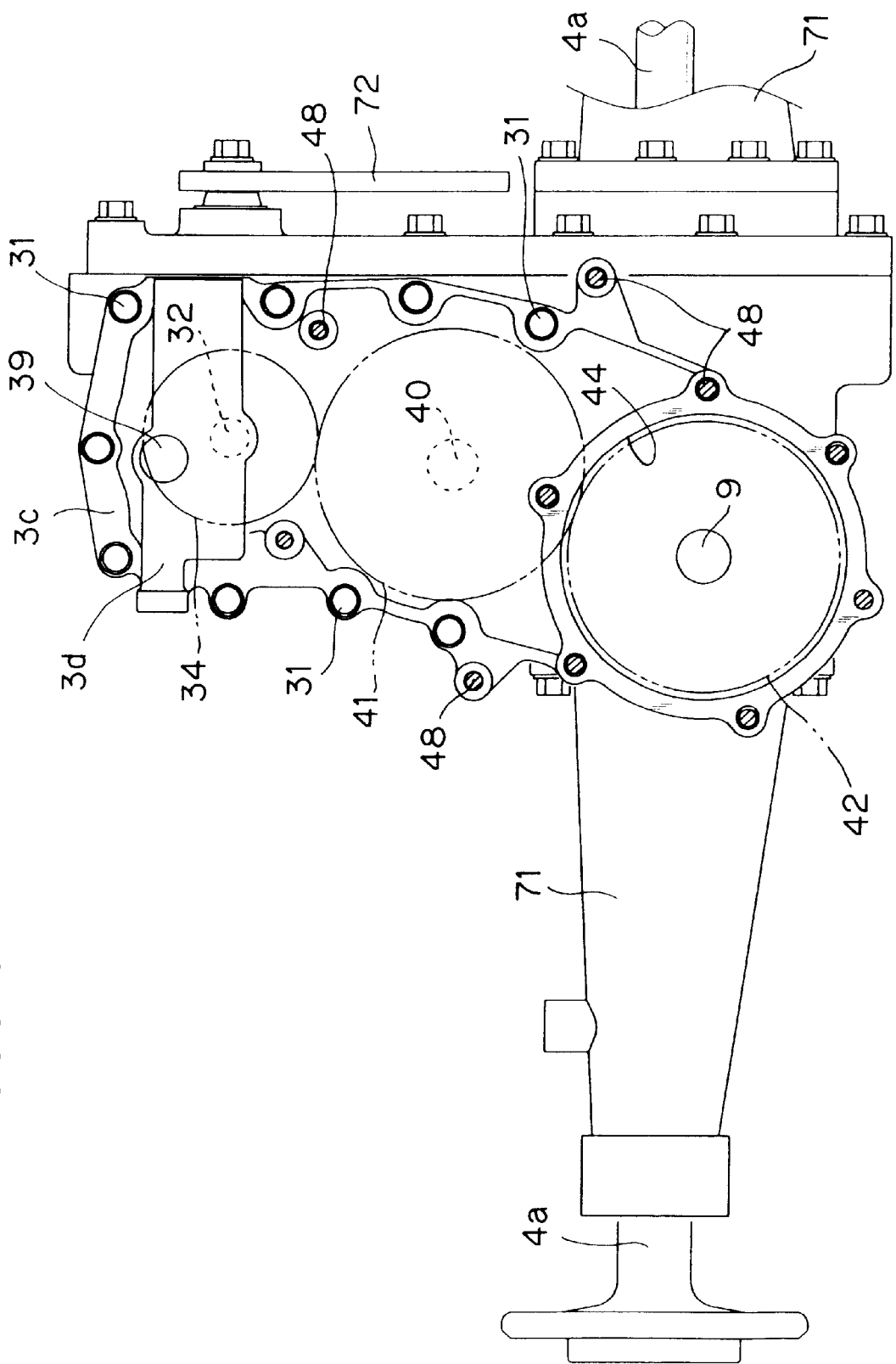
FIG. 4 is a sectional view taken generally along line IV—IV of FIG. 3.

In FIGS. 3 and 5, numeral 70 designates a detent means having a ball 70b which projects into a recess 62a, 62b or 62c in the outer surface of guide shaft 62 under the biasing force of a spring 70a disposed within the clutch shifter 63. In FIG. 4, numerals 71 designate left and right axle housings secured to left and right side surfaces of the transmission casing 3 for accommodating left and right rear wheel axles 4a and numeral 72 designates a tiltable arm for controlling the angle of the above-referenced swash plate 17a of hydraulic pump 17. As shown in FIG. 4, a rear surface of the rear cover 3c includes an expanded portion 3d for accommodating a relief valve (not shown) which determines the fluid pressure applied to the PTO clutch 37.

Figure 6:
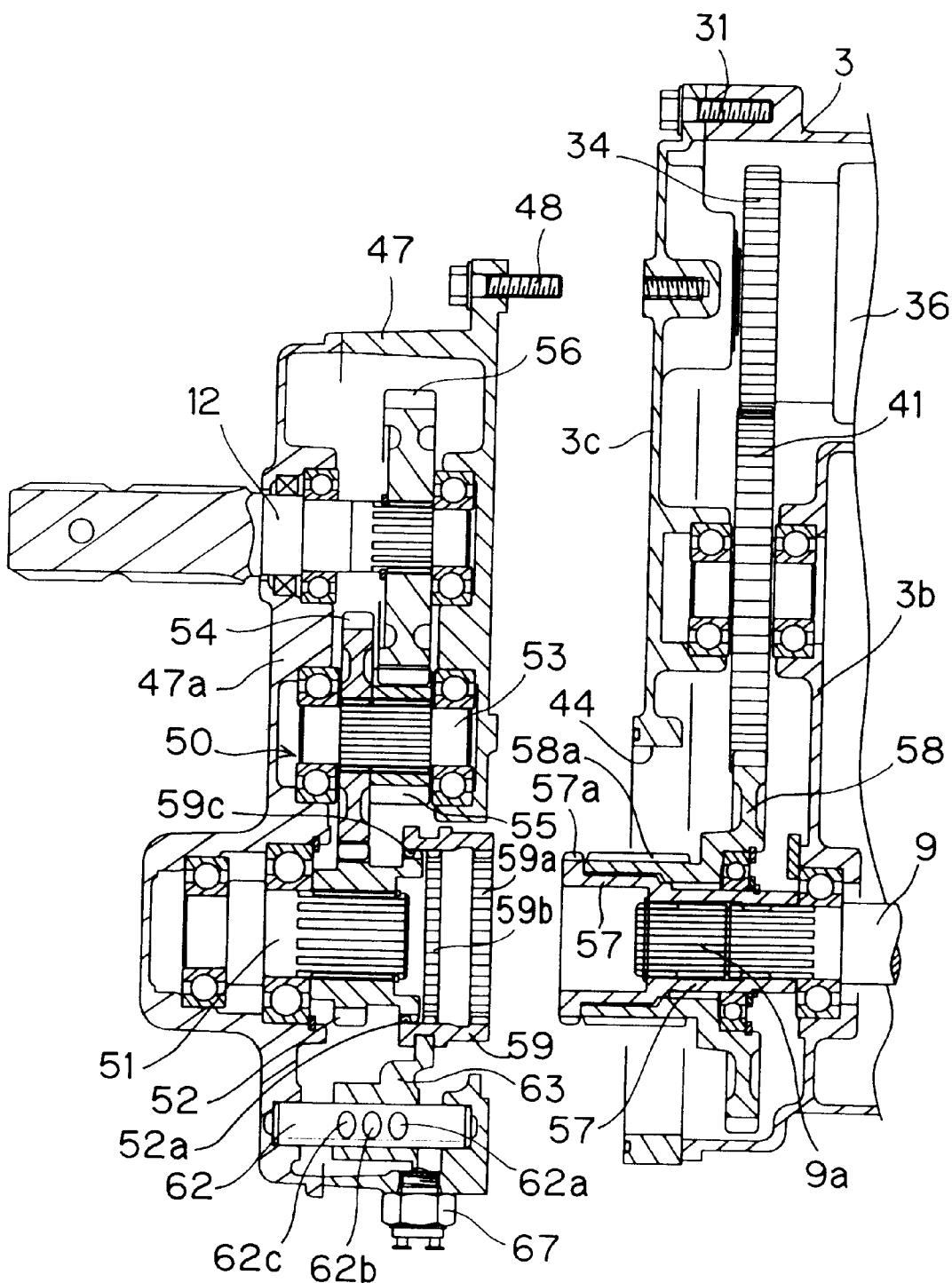
FIG. 6 is a sectional side view, partially developed, showing an assembling method of the first embodiment.

FIG. 6 shows an assembling method of the first embodiment in which the transmission casing 3 shown in FIG. 2 is modified. The sleeve 57 and gear 58 are assembled onto the rear end portion of mid-PTO shaft 9, as shown in FIG. 6, through the opening 44 of rear cover 3c of the transmission casing 3 from which the cover member 45 has been removed or which does not have such a cover member 45 originally. The power take-oft casing 47, into which the rear-PTO shaft 12 and the transmission mechanism 50 have been preassembled, is provided previously as shown, and the clutch member 59 is previously supported in the power take-off casing 47, as shown, or in the transmission casing 3. Then, the power take-off casing 47 is fixedly mounted on the rear surface of transmission casing 3 using bolts 48. Thus, the assembling operation can be made very quickly.

Figure 7:
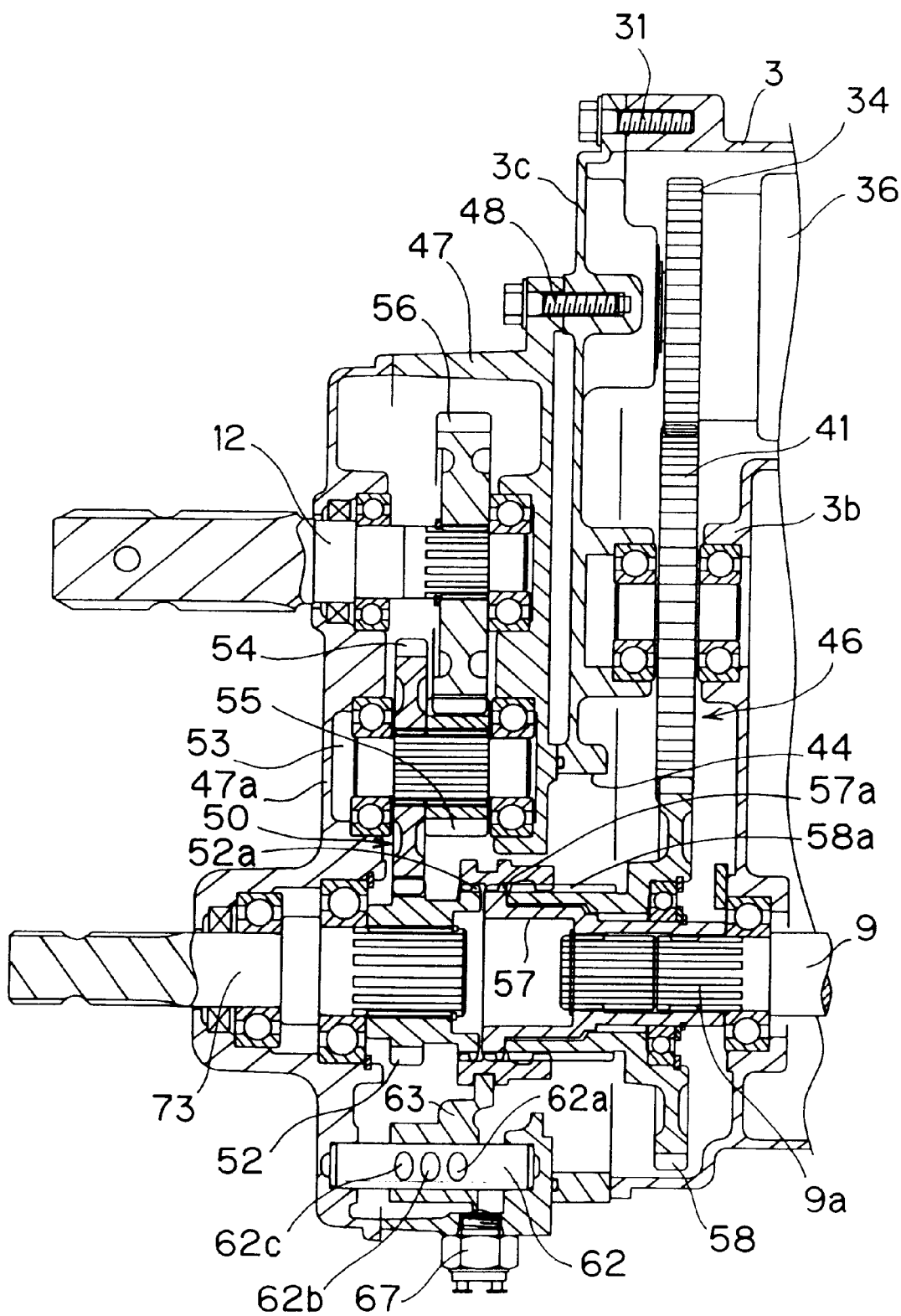
FIG. 7 is a sectional side view, partially developed, similar to FIG. 3 but showing a part of a second preferred embodiment according to the present invention.

FIG. 7 shows a second embodiment of the present invention. In this second embodiment, a shaft 73 which corresponds to the above-referenced support shaft 51 extends rearwardly from the cover plate 47a of power take-off casing 47 so as to provide a further PTO shaft. The gear 52 may be mounted rotatably on the support shaft 52 in the first embodiment, but the gear 52 is necessarily mounted fixedly on the shaft 73 in the second embodiment. The further PTO shaft 73 can be used, for example, for driving a generator which feeds electric power to an electrically driven implement such as a chain saw, or for driving an auxiliary implement having an input shaft of a relatively low level such as a glass collector. Further, when a sprayer having a liquid medicine-feeding pump and a liquid medicine-spraying fan is drawn by the vehicle for spraying agricultural medicines, the feeding pump, which is subjected to a relatively high load, may preferably be driven by the rear-PTO shaft 12 and the spraying fan, which is desirous to be rotated at a high speed, may preferably be driven by the further PTO shaft 73. The other parts of the second embodiment are structured similarly as in the first embodiment, so that the second embodiment can also be assembled very easily and quickly.

Figure 8:
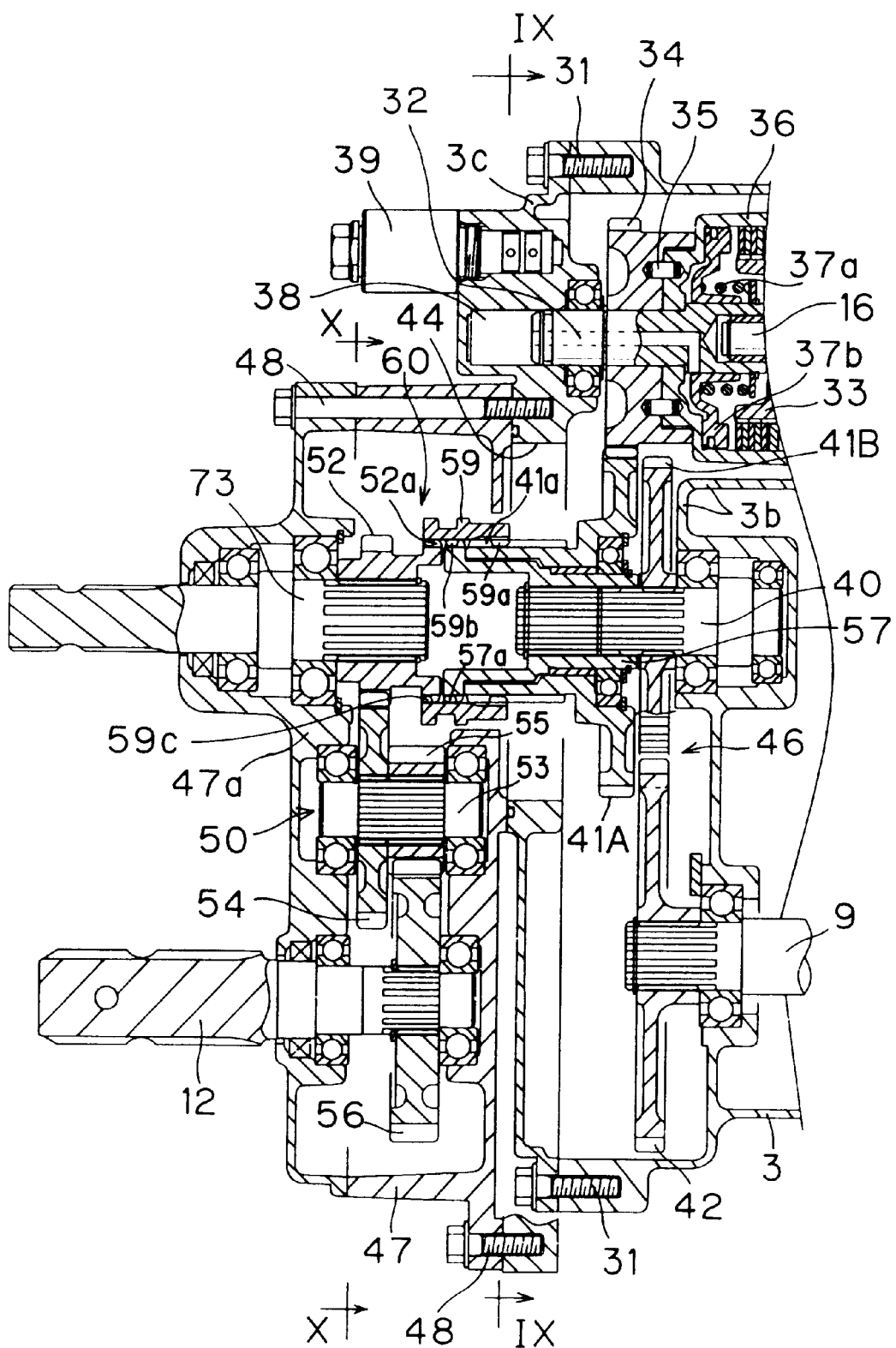
FIG. 8 is a sectional side view, partially developed, similar to FIG. 3 but showing a part of a third preferred embodiment according to the present invention.
Figure 9:
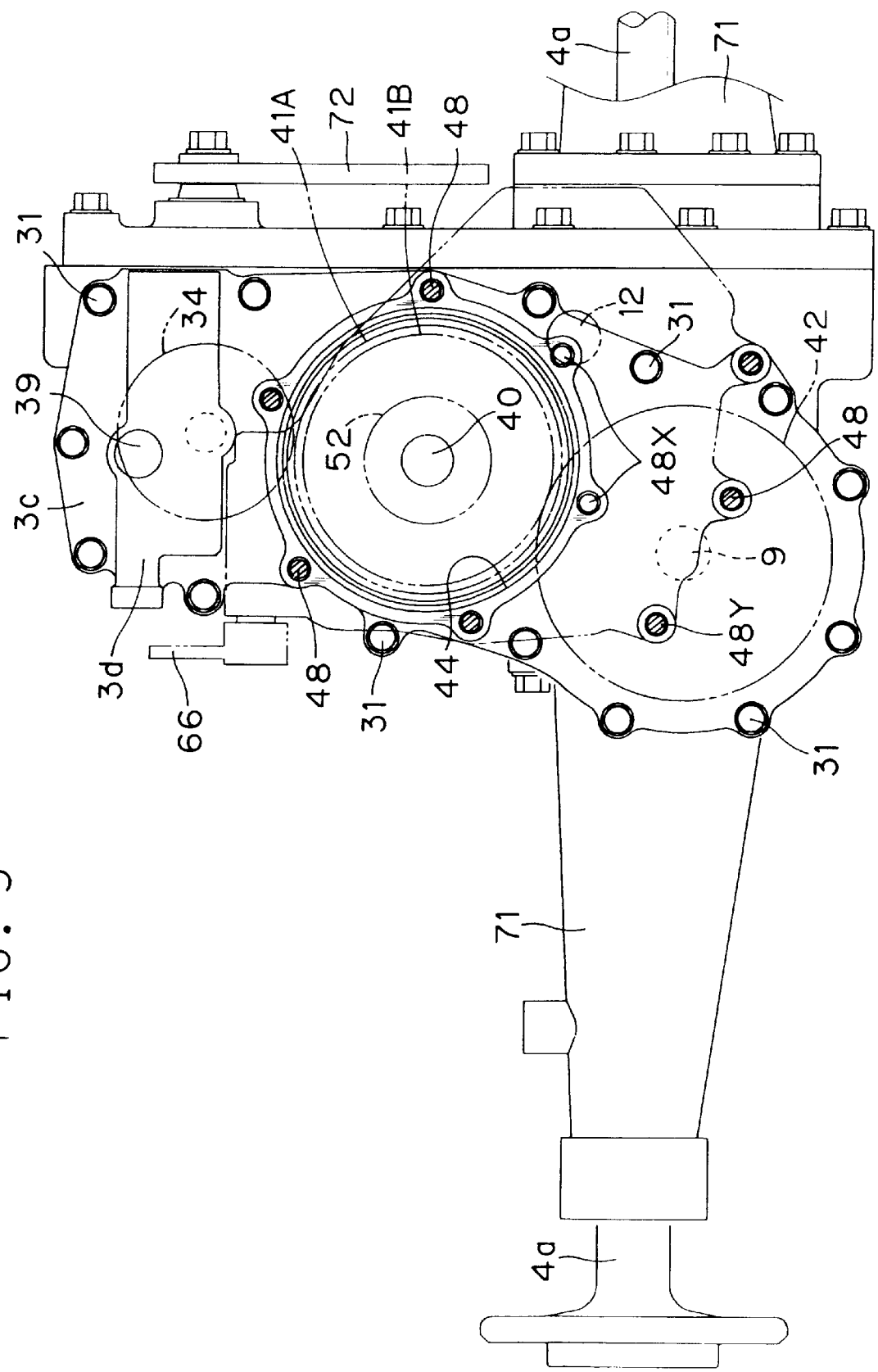
FIG. 9 is a sectional view taken generally along line IX—IX of FIG. 8.
Figure 10:
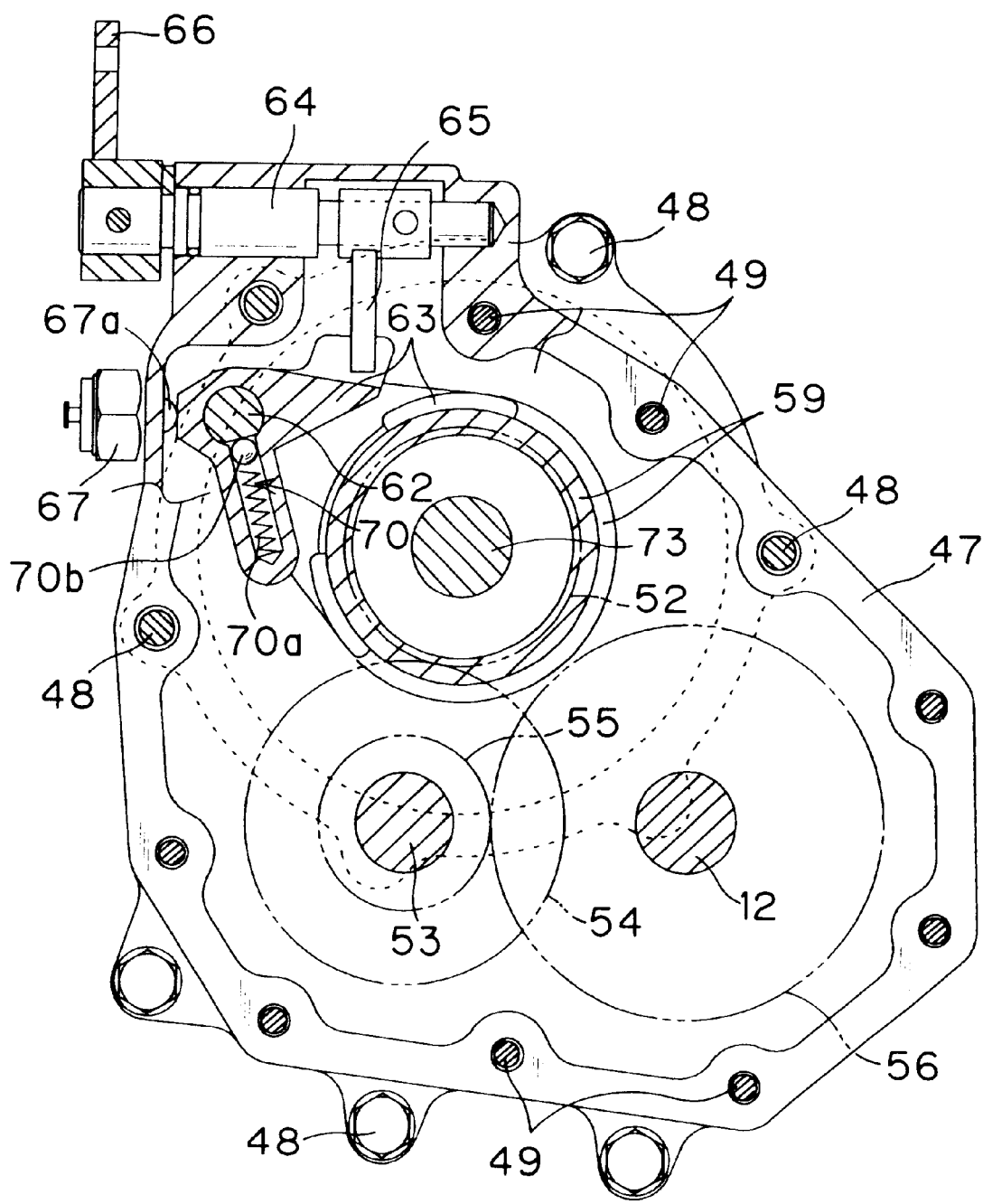
FIG. 10 is an enlarged sectional view taken generally along line X—X of FIG. 8.

FIGS. 8 to 10 depicts a third embodiment of the power take-off assembly according to the present invention. A power take-off casing 47 is fixedly mounted on the rear surface of rear cover 3c of the transmission casing 3 also in this embodiment using bolts 48, and it includes a rear end opening which is closed by a cover plate 47a attached to the casing 47 using bolts 49. As is evident from these figures, some of the bolts 48 are also used for securing the cover plate 47a together with the power take-off casing 147 to the rear cover 3c.

A rear-PTO shaft 12 is also supported by the power take-off casing 47 at a level which is higher than that of the mid-PTO shaft 9, as shown in FIG. 9, but which is lower than that of the rear-PTO shaft 12 employed in the first and second embodiment as shown in FIG. 10. In the third embodiment, driving power for the rear-PTO shaft 12 is taken off from an intermediate drive shaft 40, corresponding to the above-referenced support shaft 40, in the drive mechanism 46 for the mid-PTO shaft 9. A shaft 73 coaxial with the intermediate shaft 40 is supported by the power take-off casing 47, and a gear 52 fixedly mounted on the shaft 73 is operatively connected to the rear-PTO shaft 12 through a transmission mechanism 50 which is similar to the above-referenced transmission mechanism 50. An opening 44 corresponding to the above-referenced opening 44 is formed in the rear cover 3c of transmission casing 3 such that it is faced to the intermediate drive shaft 40. The opening 44 is closed by a cover member 45 similar to the above referenced cover member 45 when the rear-PTO shaft 12 is not provided and only the mid-PTO shaft 9 is provided. As shown in FIG. 9, threaded bores in the rear cover 3c for securing the bolts 48 are formed such that some of them 48X are used only when the cover member 45 is attached to the rear cover 3c and some of them 48Y are used only when the power take-off casing 47 is attached to the rear cover 3c. The above-referenced shaft 73 extendes rearwardly of the cover plate 47a, as in the second embodiment, so as to provide a further PTO shaft.

Two gears 41A and 41B are mounted on the intermediate drive shaft 40 in place of the above-referenced gear 41. The gear 41A is rotatably mounted on a sleeve 57, which is in turn fixedly mounted on the intermediate drive shaft 40, and is meshed with the gear 34 of driving side. The other gear 41B is fixedly mounted on the intermediate drive shaft 40 and is meshed with a gear 42 which is fixedly mounted on the mid-PTO shaft 9. The boss portion of gear 40A and the sleeve 57 extend respectively toward the gear 52, and splined teeth 52a, 57a and 41a are formed respectively on the outer surfaces of the boss portion of gear 52, the sleeve 57 and the boss portion of gear 41A. A sleeve-shaped clutch member 593 is slidably mounted on the splined teeth 52a, 57a and 41a and is provided, in its inner surface, with three sets of splined teeth 59a, 59b and 59c which are formed intermittently along the length of clutch member 53.

The clutch member 59 is adapted to be slidingly displaced axially to three positions. The splined teeth 59a, 59b and 59c of clutch member 59 are formed such that, in accordance with the displaced positions of clutch member, the foremost splined teeth 59a are always kept engaged with the splined teeth 41a of gear 41A, the middle splined teeth 59b are disengaged from the splined teeth 57a of sleeve 57 at the foremost displaced position of clutch member 59, are engaged with the splined teeth 57a of sleeve 57 at the intermediate displaced position of clutch member 59, and are engaged with the splined teeth 52a of gear 52 at the rearmost displaced position of clutch member 59, and the rearmost splined teeth 59c are engaged, with the splined teeth 57a of sleeve 57, are engaged with the splined teeth 52a of gear 52 at the intermediate displaced position of clutch member 59, and are disengaged from the splined teeth 52a of gear 52 at the rearmost displaced position of clutch member 59.

Thus, a clutch 60 is provided which is operable, in accordance with the displaced positions of clutch member 59, to couple the sleeve 57 to the gear 41A at the foremost displaced position of clutch member 59 so as to drive only the mid-PTO shaft 9, to couple the sleeve 57 and the gear 52 to the gear 41A at the intermediate displaced position, shown in FIG. 8, of clutch member 59 so as to drive both of the mid-PTO shaft 9 and the rear-PTO shaft 12, and to couple the gear 52 to the gear 41A at the rearmost displaced position of clutch member 59 so as to drive only the rear-PTO shaft 12. That is, the clutch 60 which functions similarly to the above-referenced clutch 60 is provided also in the third embodiment.

As shown in FIG. 10, a control mechanism for displacing the clutch member 59 and a sensor switch 67 associated thereto are provided also in the third embodiment. A movable contact 67a of the sensor switch 67 is faced, at an inside of the power take-off casing 47, to the clutch shifter 63 such that, when the clutch shifter 63 is displaced to the positions where the mid-PTO shaft 9 is driven, namely to the positions where only the mid-PTO shaft 9 is driven and where the mid-PTO shaft 9 and the rear-PTO shaft 12 are driven, the movable contact 67a is pushed by the clutch shifter 63 whereby the sensor i switch 67 is operated. That is, a danger encountered by an operator in getting out of the vehicle when the mid-PTO shaft 9 is rotating can be avoided in advance. The other parts of the third embodiment are same as those in the above-referenced embodiments.

Although the present invention is embodied in a working vehicle in which a transssmission casing 3 is disposed between left and right rear wheels which constitute the drive wheels for the vehicle, the present invention can also be embodied in a working vehicle in which a transmission casing is disposed between left and right front wheels which constitute the drive wheels for the vehicle. In this case, a power take-off casing is mounted on an outer surface of a front wall of the transmission casing and a front-PTO shaft is provided such that it extends forwardly from the power take-off casing.

We claim:

1. In a working vehicle in which a transmission casing (3) having left and right drive wheel axles (4a) is disposed between left and right drive wheels (4) and in which there is provided a differential gearing differentially connecting said left and right drive wheel axles, and a mid-PTO shaft (9) which extends from the inside of said transmission casing (3) through a first axial end wall (3a) of said transmission casing located at an inner side of the longitudinal direction of the vehicle, a power take-off assembly characterized in:

that a power take-off casing (47) is mounted on an outer surface of a second axial end wall (3c) of said transmission casing (3) located at an outer side of the longitudinal direction of the vehicle, said power take-off casing (47) including in it a second PTO shaft, which extends from said power take-off casing in a direction opposite to said mid-PTO shaft (9), and a transmission mechanism (50) for transmitting power to said second PTO shaft (12);

that said left and right drive wheel axles (4a) have a common axis, which crosses said mid-PTO shaft (9) perpendicularly between said first axial end wall (3a) and said second axial end wall (3c);

that an input member (52) of said transmission mechanism (50) is operatively connected to a drive mechanism (46) for said mid-PTO shaft (9) in said transmission casing (3) through an opening (44) in said second axial end wall (3c); and that a clutch (60) for selectively cutting-off the drive of said second PTO shaft is provided.

2. In a working vehicle in which a transmission casing (3) having left and right drive wheel axles (4a) is disposed between left and right drive wheels (4) and in which there is provided a mid-PTO shaft (9) which extends from the inside of said transmission casing (3) through an axial end wall (3a) of said transmission casing located at an inner side of the longitudinal direction of the vehicle, a power take-off assembly characterized in:

that a power take-off casing (47) is mounted on an outer surface of an axial end wall (3c) of said transmission casing (3) located at an outer side of the longitudinal direction of the vehicle, said power take-off casing (47) including in it a second PTO shaft, which extends from said power take-off casing in a direction opposite to said mid-PTO shaft (9), and a transmission mechanism (50) for transmitting power to said second PTO shaft (12);

that an input member (52) of said transmission mechanism (50) is operatively connected to a drive mechanism (46) for said mid-PTO shaft (9) in said transmission casing (3) through an opening (44) in said axial end wall (3c) located at the outer side of the longitudinal direction of the vehicle and is arranged coaxially with said mid-PTO shaft (9);

that said drive mechanism (46) includes a drive gear (58) which is rotatably mounted on said mid-PTO shaft (9) and is meshed with a gear (41) of driving side; and that a clutch (60) for selectively cutting-off the drive of said second PTO shaft is structured such that it is shifted selectively to a condition where said drive gear (58) is coupled to said mid-PTO shaft (9) and to another condition where said drive gear (58) is coupled to said input member (52).

3. The power take-off assembly as set forth in claim 2, wherein said clutch (60) is structured such that it is further shifted to a condition where said drive gear (58) is coupled to said mid-PTO shaft (9) and to said input member (52) at a same time.

4. The power take-off assembly as set forth in claim 3, wherein there is provided a sensor switch (67) for sensing conditions where said drive gear (58) is coupled to said mid-PTO shaft (9), said sensor switch (67) being operated by a shifter member (63) for shifting said clutch (60).

5. In a working vehicle in which a transmission casing (3) having left and right drive wheel axles (4a) is disposed between left and right drive wheels (4) and in which there is provided a mid-PTO shaft (9) which extends from the inside of said transmission casing (3) through an axial end wall (3a) of said transmission casing located at an inner side of the longitudinal direction of the vehicle, a power take-off assembly characterized in:

that a power take-off casing (47) is mounted on an outer surface of an axial end wall (3c) of said transmission casing (3) located at an outer side of the longitudinal direction of the vehicle, said power take-off casing (47) including in it a second PTO shaft, which extends from said power take-off casing in a direction opposite to said mid-PTO shaft (9), and a transmission mechanism (50) for transmitting power to said second PTO shaft (12);

that an input member (52) of said transmission mechanism (50) is operatively connected to a drive mechanism (46) for said mid-PTO shaft (9) in said transmission casing (3) through an opening (44) in said axial end wall (3c) located at the outer side of the longitudinal direction of the vehicle and is arranged coaxially with an intermediate drive shaft (40) which is provided in said drive mechanism (46) and is operatively connected to said mid-PTO shaft (9);

that said drive mechanism (46) includes a drive gear (41A) which is rotatably mounted on said intermediate drive shaft (40) and is meshed with a gear (34) of driving side; and that a clutch (60) for selectively cutting-off the drive of said second PTO shaft is structured such that it is shifted selectively to a condition where said drive gear (41A) is coupled to said intermediate drive shaft (40) and to another condition where said drive gear (41A) is coupled to said input member (52).

6. The power take-off assembly as set forth in claim 5, wherein said clutch (60) is structured such that it is further shifted to a condition where said drive gear (41A) is coupled to said intermediate drive shaft (40) and to said input member (52) at a same time.

7. The power takeoff assembly as set forth in claim 6, wherein there is provided a sensor switch (67) for sensing the conditions where said drive gear (41A) is coupled to said drive shaft (40), said sensor switch (67) being operated by a shifter member (63) for shifting said clutch (60).

8. In a working vehicle in which a transmission casing (3) having left and right drive wheel axles (4a) is disposed between left and right drive wheels (4) and in which there is provided a mid-PTO shaft (9) which extends from the inside of said transmission casing (3) through an axial end wall (3a) of said transmission casing located at an inner side of the longitudinal direction of the vehicle, a power take-off assembly characterized in:

that a power take-off casing (47) is mounted on an outer surface of an axial end wall (3c) of said transmission casing (3) located at an outer side of the longitudinal direction of the vehicle, said power take-off casing (47) including in it a second PTO shaft, which extends from said power take-off casing in a direction opposite to said mid-PTO shaft (9), and a transmission mechanism (50) for transmitting power to said second PTO shaft (12);

that an input member of said transmission mechanism (50) is operatively connected to a drive mechanism (46) for said mid-PTO shaft (9) in said transmission casing (3) through an opening (44) in said axial end wall (3c) located at the outer side of the longitudinal direction of the vehicle and is composed of an input gear (52) mounted on a shaft (51; 73) which is arranged in parallel with said second PTO shaft (12) and is supported by said power take-off casing (47);

that said transmission mechanism (50) comprises a speed-reduction gear train for transmitting power from said input gear (52) to said second PTO shaft (12) at a reduced speed of rotation; and that a clutch (60) for selectively cutting-off the drive of said second PTO shaft is provided.

9. The power take-off assembly as set forth in claim 8, wherein said input gear (52) is fixedly mounted on said shaft (73), the said shaft extending outwardly from said power take-off casing (47) in a direction same as said second PTO shaft (12) so as to provide a third PTO shaft (73).

10. In a working vehicle in which a transmission casing (3) having left and right drive wheel axles (4*a*) is disposed between left and right drive wheels (4) and in which there is provided a mid-PTO shaft (9) which extends from the inside of said transmission casing (3) through an axial end wall (3*a*) of said transmission casing located at an inner side of the longitudinal direction of the vehicle, a power take-off assembly characterized in:

that a power take-off casing (47) is mounted on an outer surface of an axial end wall (3*c*) of said transmission casing (3) located at an outer side of the longitudinal direction of the vehicle, said power take-off casing (47) including in it a second PTO shaft, which extends from said power take-off casing in a direction opposite to said mid-PTO shaft (9), and a transmission mechanism (50) for transmitting power to said second PTO shaft (12);

that an input member of said transmission mechanism (50) is operatively connected to a drive mechanism (46) for said mid-PTO shaft (9) in said transmission casing (3) through an opening (44) in said axial end wall (3*c*) located at the outer side of the longitudinal direction of the vehicle;

that said drive wheels (4) are left and right rear wheels between which said transmission casing (3) is disposed;

that said second PTO shaft is a rear-PTO shaft (12) which extends rearwardly of said power take-off casing (47); and that a clutch (60) for selectively cutting-off the drive of said second PTO shaft is provided.

11. In a working vehicle in which a transmission casing (3) having left and right drive wheel axles (4*a*) is disposed between left and right drive wheels (4) and in which there is provided a mid-PTO shaft (9) which extends from the inside of said transmission casing (3) through a first axial end wall (3*a*) of said transmission casing located at an inner side of the longitudinal direction of the vehicle, a power take-off assembly characterized in:

that a power take-off casing (47) is mounted on an outer surface of a second axial end wall (3*c*) of said transmission casing (3) located at an outer side of the longitudinal direction of the vehicle, which is separable from said transmission casing (3), said power take-off casing (47) including in it a second PTO shaft, which extends from said power take-off casing in a direction opposite to said mid-PTO shaft (9), and a transmission mechanism (50) for transmitting power to said second PTO shaft (12);

that an input member (52) of said transmission mechanism (50) is operatively connected to a drive mechanism (46) for said mid-PTO shaft (9) in said transmission casing (3) through an opening (44) in said second axial end wall (3*c*) located at the outer side of the longitudinal direction of the vehicle; and that a clutch (60) for selectively cutting-off the drive of said second PTO shaft is provided.

\* \* \* \* \*